Figure 1:
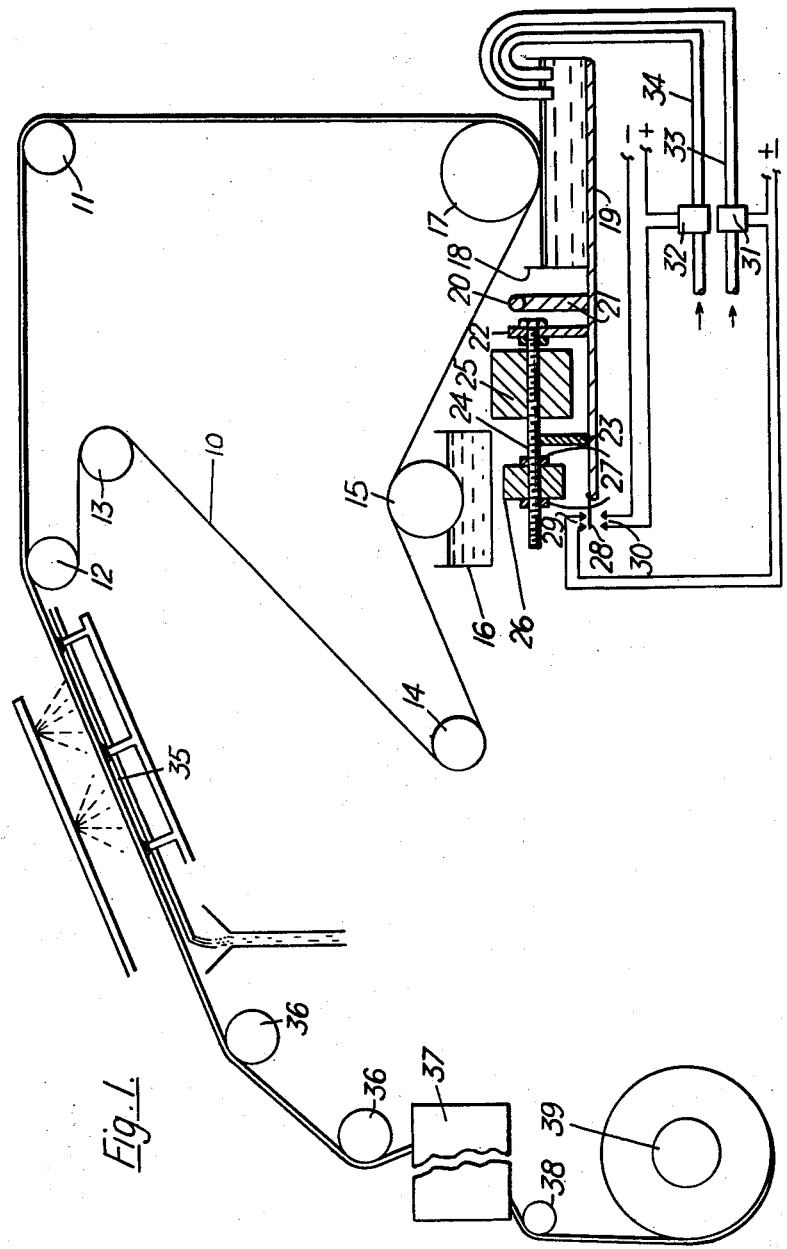

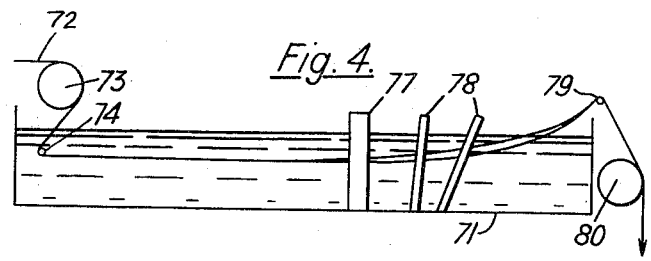
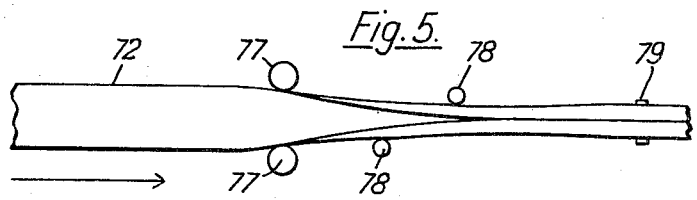
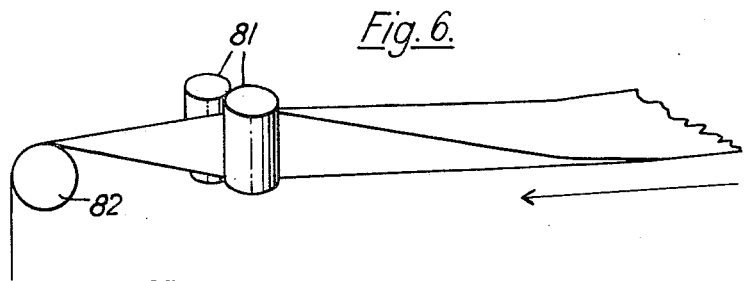
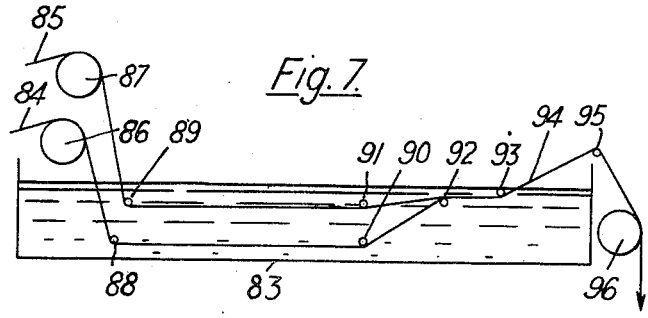

United States Patent Office 3,216,878
Patented Nov. 9, 1965

3,216,878
METHOD AND APPARATUS FOR MAKING THIN RUBBER TAPES
John Leathem Matthew Newnham, Donald James Simcox, Richard Charles Foster, and Kenneth Osborne Calvert, all of Erdington, Birmingham, England, assignors to Dunlop Rubber Company Limited, London, England, a British company
Filed Oct. 14, 1960, Ser. No. 62,703
Claims priority, application Great Britain, Oct. 20, 1959, 35,551/59
4 Claims. (Cl. 156—246)

This invention relates to the production of thin rubber tape of uniform thickness from latex.

Various articles such as cut thread for use in clothing and surgical supports and tape for golf ball centres are made from long thin strips or tapes of rubber which must be of uniform thickness throughout their length. The usual method of making such tapes is to calender a suitable rubber compound and subsequently to vulcanise and cut the continuous sheet produced into tapes of the desired width.

It is known that a natural rubber article produced directly from latex, for example by coagulation and/or drying, has a tensile strength much greater than that of a similar article produced from milled and calendered rubber. Moreover the equipment and process costs for the production of the latex article are much lower. It has however not hitherto been practicable to make thin rubber tapes of the required degree of uniformity directly from latex, and it is an object of the present invention to provide a method of doing this and also suitable forms of apparatus for carrying out such method.

According to the invention such tapes are produced by causing a moving belt carrying a layer of coagulant to pass in contact with the surface of a body of latex in a bath, and when the resulting layer of latex on the belt has become coagulated separating the tape so formed from the belt.

When the speed of the belt, the strength of the coagulant, the viscosity of the latex and the temperature conditions are all substantially uniform, the thickness of the resulting latex tape taken as a whole is found, contrary to expectations, to be almost independent of small differences in the height of the latex in the bath. If the latex level is a little high and the edges of the belt enter the latex, the resulting tape has edges of uneven thickness which can however easily be removed, though in such case the tape may be less easy to remove from the belt; when the latex level is a little low the whole width of the belt may not be covered and the tape produced tends to be variable in width though substantially uniform in thickness.

The coagulant can be applied to the belt in any suitable way, for example by passing the belt over a driven or free running roller or other applicator which dips into a bath of the coagulant, or less desirably by passing the belt itself through, or in contact with, a bath of the coagulant and if desired subsequently removing excess coagulant by means of squeeze rolls, doctor blades, or other suitable means. The belt can be of any suitable material, for example natural or synthetic rubber, preferably fabric-reinforced, or stainless steel. If not made of rubber it can with advantage be faced with a natural or synthetic rubber, for example a butadiene-acrylonitrile rubber, or with polyvinyl chloride or a similar material, for example another vinyl chloride polymer that is not attacked by the latex or coagulant. The construction of the belt must be such that it retains its flat configuration during use, and it must be resistant to attack by the latex and coagulant employed.

The coagulant-carrying belt can be contacted with the surface of the latex in the bath by either of two main methods, which may be termed respectively the short contact method and the long contact method.

In the first of these the belt contacts the latex surface for only a short time, normally about 5 seconds or less; such contact times are considerably shorter than the time required for the coagulant to penetrate the whole thickness of the deposited latex layer. Such contact times will usually involve a contact distance of the belt and the latex surface not more than about 1 foot. For example, the belt may travel between two driven or free running rollers for say 6–12 inches parallel to and in contact with the latex surface. Preferably however the belt is passed round a single roller, giving in practice a contact distance of about 2–3 inches. It is a characteristic of this method that the amount of latex picked up by the belt, and thus the thickness of the tape formed, increases with increasing speed of the belt when the other conditions remain the same. It has been found that, generally speaking, a belt speed of 10 feet per minute corresponds to a tape thickness of about 0.012 inch, but this figure will of course vary somewhat with the particular latex used and the other conditions. This method has the advantage that tape having a thickness varying only between about ±2.5 percent or less can readily be obtained, such tape having an excellent and uniform surface appearance.

In the long contact method, on the other hand, the belt is in contact with the latex surface for a time at least sufficient, and preferably more than sufficient, for the coagulant on the belt to penetrate a layer of the latex of thickness corresponding to that desired in the final tape. For example, any particular portion of the belt can be in contact with the latex surface for 15–120 seconds, and especially for 30–75 seconds. In this method, the thickness of the final tape decreases with increasing speed of the tape, other things being equal. As compared with the short contact process, the thickness of the tape produced is found to vary between somewhat wider limits, up to ±5 percent; on the other hand it is easier to make fairly thick tapes, that is to say tapes above 0.01 inch and especially between 0.01 and 0.02 inch thick, by the long contact method. If tapes substantially thicker than 0.02 inch are required, it is usually preferable to combine two or more layers of thinner tape or to fold a single tape longitudinally as more fully described below.

The coagulant employed is preferably one which has a high coagulating power and also is capable of penetrating the latex layer without forming a skin. Aqueous solutions of calcium or zinc salts, for example the chlorides, have these properties, though the use of zinc salts alone tends to give an uneven tape. It is preferred to use a solution of calcium chloride of concentration 20–40 percent, optionally with not more than one part of zinc chloride for each 4 parts of calcium chloride, for example one part of zinc chloride for each 4–8 parts of calcium chloride, by weight. Other coagulants that can be used, though with less advantage, include aqueous solutions of calcium nitrate, aluminium sulphate, acetic acid, formic acid, cyclohexylamine acetate and alcohol. It is advisable, though not essential, to include in the coagulant a wetting agent.

The optimum amount of coagulant to be carried by the belt in any particular case will be easily determined by routine experiment. When this amount is used the belt is left completely dry and clean when the formed tape is removed from it, but if too much is used the belt remains wet, and must be washed and dried before it picks up further coagulant if dilution of the coagulant bath is to be avoided.

It is possible to accelerate the coagulation by heat, for example by passing the belt carrying the latex past a source of radiant heat, such as a source of infra-red radiation; however this is not as a rule advisable.

While as stated above the thickness of the tape formed is not directly dependent on the level of the latex surface in the bath relative to the travelling belt, it is very advisable to keep this approximately constant, in particular to within a tolerance of ±0.05 inch or less.

When operating the long contact method the control of the latex level can if desired be effected manually, using a control valve in the feed line, but with the short contact method an automatic control, for instance as described below, is highly desirable. Such control can of course also be applied to the long contact method.

In a preferred method of obtaining automatic control of the latex surface level, the latex is contained in a bath supported on a pivoted arm and balanced by a counter weight on the other end of the arm. The balance is such that so long as the correct amount of latex is being fed into the bath (that is to say just as much as is being removed on the belt) the system remains in balance in its normal operating position. If too little latex is supplied the bath will rise; if too much it will drop, and the rise or fall in the bath, besides maintaining approximately the correct spatial relation between the belt and the surface of the latex, is also used to control the rate of feed of latex to the bath, increasing it when the bath rises, and decreasing it when it falls In one useful control method the latex can be supplied by two tubes each controlled by a valve operated by a solenoid, which in turn is controlled by a relay operated by a switch, which in turn is operated, directly or indirectly by means of a photo-electric cell or other mechanism, in accordance with the position of the bath. When the bath is in its normal position one valve is open and the other shut, so that the latex can enter through one tube only. If the bath rises too high the second valve is opened so that the rate of flow of latex into the bath increases; if on the other hand the bath falls too low, both valves are closed, and the supply of latex is thus cut off.

Another device that can be used to keep the latex surface at an approximately constant level is described in British specification No. 388,216. In this, a container for the latex is suspended by a spring of suitable strength, so that as the latex is siphoned off into the latex bath the spring contracts by an amount equal to the fall in height of the latex level, and vice versa when the container is being filled. The supply of latex in the container is maintained by means of a supply tube opened and closed by a solenoid-operated valve. When the container is in its uppermost position it operates a rocker-arm mercury switch, which closes an electric circuit to the solenoid and so opens the valve to allow faster or free flow of the latex into the container. This rate of flow continues until the filled container is at its lowest position, when the electric circuit is again broken and the latex flow slowed down or arrested. The movement of the container is preferably damped, for example by the use of a damping fluid.

A suitable fine degree of control can be achieved by testing the level at frequent intervals using a testing device which indicates when the permissible variation in level is exceeded in either direction, and providing means operated by the testing device for rapidly altering the level. Preferably a test is made at intervals of less than a minute, for example of 20–40 seconds or even more frequently.

A suitable testing device comprises two testing needles, one of which is longer than the other. For example when the desired tolerance in latex lever is 0.01 inch, one needle will be 0.02 inch longer than the other. The needles, which may conveniently be about 0.5 inch apart, are insulated from each other in a testing unit which is firmly attached to the bed of the plant. When the latex is at the correct level one needle makes electrical contact with the latex and the other does not. If the latex level is too high by 0.01 inch or more both needles are in electrical contact with the latex. When the latex level is too low by 0.01 inch or more neither needle makes electrical contact with it. A fixed contact is provided in the latex whereby an electrical circuit is completed through the latex and the needle or needles in contact with it, by means of which the level-adjusting means is operated. Preferably the testing needles pass through an open-weave cotton or other fabric and on being withdrawn from the latex after a test are cleaned thereby from adhering latex, after which the fabric is moved on so that unused fabric is available after each successive test.

Several methods can be used, either alone or in combination, to adjust the level of the latex rapidly and automatically according to the test result obained at each dipping of the needle unit.

In a preferred method electrically-controlled bellows are provided by means of which latex can be immediately withdrawn from or forced into the bath, as required by the needle test.

In another method, which may advantageously be used in conjunction with the bellows, a controller, for example an electronic controller, operated by the needle test unit accelerates the movement of the latex container, so decreasing the time needed to adjust the level of the latex in the bath as required by the needle test.

In yet another method the latex bath, or a platform or the like supporting it, can be rapidly lowered or raised as by means of a fine screw thread.

Another expedient method that can be employed, preferably in conjunction with a control method already described, is to admit more latex than is required to the latex bath and to allow the excess latex to fall over a weir placed in the bath at the optimum pre-determined height in relation to the belt. The excess latex can if desired be filtered and re-circulated.

With all the methods described above, it is necessary to de-aerate the latex before it enters the bath, and to prevent the introduction of air when the latex is admitted to the latex bath.

After leaving the latex bath the belt travels through the air for a distance sufficient, at the running speed employed, for the latex taken up to be gelled by the coagulant on the belt. This will usually require about 10–60 seconds or more, depending on the thickness of the tape formed. The resulting tape is then removed from the belt, washed, preferably with water, dried and batched up as required. All these operations can be performed by means well known in the art.

While the methods described above give excellent results when applied to the production of tapes up to 0.012 inch thick (by the short contact method) or 0.020 inch thick (by the long contact method), if thicker tapes are reqiured it is preferred to make them by forming a multiple, normally a double, thickness of the uncured tape and then curing the product to form a unitary thick tape. This is conveniently done by folding the tape longitudinally after it has left the belt, for example while it is being washed. Thus the tape can be guided into the form of a U, for example while passing through the washing device, and then formed into a flattened approximately cylindrical form, in which it is passed over a roll of small diameter where it assumes the form of a doubled tape with two folds and a joint down the centre line. Alternatively the tape can be folded along a single line only. Another useful method is to produce two or more tapes simultaneously and to arrange that they enter a washing bath immediately above or below each other and then to bring the wash tapes together under water to form a laminate. Even when such tapes are fully washed before being folded or laminated, excellent adhesion is obtained in the uncured state, and on curing an inseparable bond is formed.

The process of the invention is especially useful in the production of rubber tape from natural rubber latex, but synthetic latices, for example neoprene latex, butadiene/ acrylonitrile copolymer latex and butadiene/styrene copolymer latex, can also be used.

The invention is illustrated in the accompanying drawings, in which—

Figure 2:
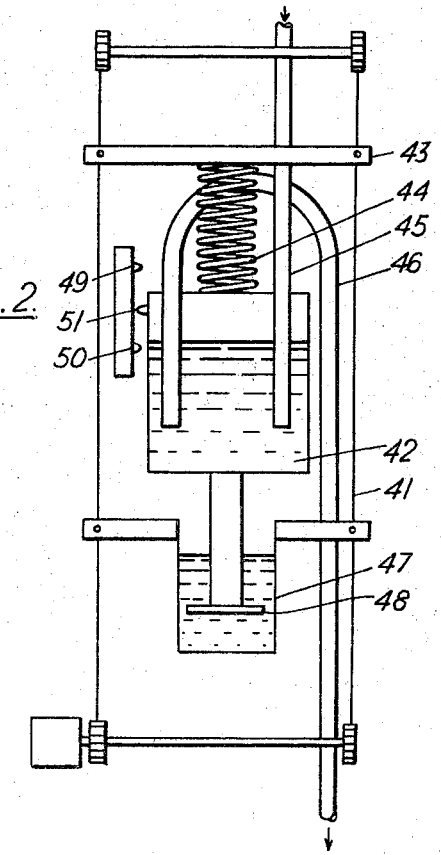
Figure 3:
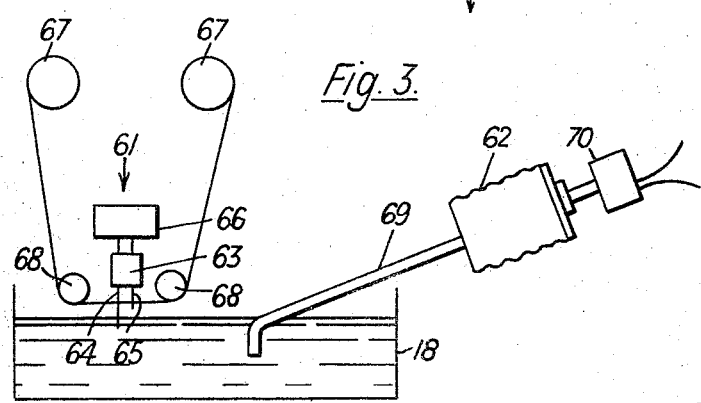

FIGURE 1 is a diagrammatic side view, partly in section, of a tape-forming apparatus, FIGURE 2 is a side view in section of a device that can be used to supply latex to a bath, FIGURE 3 is a diagrammatic side view, partly in section, of a device for testing and adjusting the level of the latex in a bath, FIGURE 4 is a side view in section of a device for simultaneously washing and longitudinally folding a tape, FIGURE 5 is a top view showing the tape being folded, FIGURE 6 is a side view of another folding device, and FIGURE 7 is a side view in section of a device for simultaneously washing and applying together two separate tapes.

Referring now to the drawings, the apparatus shown in FIGURE 1 comprises an endless belt 10 carried on guide rolls 11, 12, 13 and 14, and passing over an applicator roll 15 partially immersed in coagulant in a bath 16 which is kept constantly replenished, and under a coating roll 17 positioned just above the operative liquid level in a latex bath 18. Any one or more of these rolls can be driven.

The bath 18 is mounted on an arm 19 pivoted at 20 via bracket 21. Mounted on the arm beyond the pivot are brackets 22, 23 carrying a threaded bar 24 on which are mounted a fixed main counterweight 25 and an adjustable auxiliary counterweight 26, which can be held in any position on the threaded bar 24 by means of nuts 27. An electric contact 28 extends from the end of the bar.

Respectively above and below the contact 28, and about 0.16 inch apart, are pairs of fixed contacts 29, 30 in circuit with solenoids 31, 32 which control valves (not shown) in latex feed pipes 33, 34 leading into the bath 18. The arrangement is such that when the surface of the latex in the bath 18 is at the optimum operating level, the electric contact 28 is equidistant from each of the pairs of fixed contacts 29 and 30. Normally latex is fed to the bath through feed pipe 33 only. When the amount of latex in the bath 18 exceeds that required to balance the arm 19 horizontally, the bath sinks, thus at one and the same time effecting some adjustment in the position of the latex surface in relation to the belt 10 where it passes under the coating roll 17, and also causing the contact 28 to rise, close the circuit including the fixed contacts 29, and partly or completely close the valve in feed pipe 33. The level of the latex in the bath will then fall until the circuit is broken by the return of the arm 19 towards its balanced position, and the supply of latex through feed pipe 33 is resumed at its original rate. Similarly if the amount of latex in the bath falls below the optimum, the bath 18 will rise and the contact 28 fall until it completes the circuit including the fixed contacts 30, operating the solenoid 32 and opening the valve in the feed pipe 34, so increasing the rate of supply of latex until balance is again achieved, the circuit is broken, and consequently the valve in feed pipe 34 is again closed.

The apparatus comprises also a continuous water washer 35 of any suitable conventional design, followed by guide and tensioning rolls 36, a hot air drier 37, a further guide and tensioning roll 38, and a talcing and winding up device indicated generally by 39.

In operation the belt 10 is set in motion, the bath 16 is kept replenished with coagulant, and the rate of supply of latex through feed pipe 33 is manually adjusted to provide a rate of feed of latex as nearly as possible equal to the rate at which latex is removed on the belt.

The rate of travel of the belt and the length of its path between the coating roll 17 and the guide roll 12 are so correlated that before reaching the latter the latex taken up by the belt has become fully coagulated. This will usually require from 10 to 60 seconds but time should be allowed for the coagulated latex to become fully consolidated before it is removed from the belt. In practice the length of the path of the belt from the coating roll to the guide roll 12 can suitably be from 2 to 20 feet. It will however be understood that these figures can be varied to suit particular circumstances; for example a slow-acting coagulant will require a longer path. At the guide roll 12 the rubber tape, now fully coagulated and sufficiently consolidated, leaves the belt 10 and is carried through the washer 35 and the drier 37 to the device 39 where it is talced and wound up.

This apparatus can be modified in various ways. Thus other methods of ensuring a constant level of latex in the bath 18 can be provided, for instance as described below. Moreover the single coating roll 17 can be replaced by two or even more rolls positioned so as to cause the belt to travel parallel to the surface of the latex, for example for 6–9 inches. (In practice the single roll shown in the drawing gives a contact length of 2–3 inches.) Further, if it is desired to work by the long contact method, the bath 18 may be made much longer and two or more rolls provided so as to cause the belt to move parallel to the surface of the latex over a distance of for example 4–6 feet. As already stated, in this method of working the automatic level control can if desired be dispensed with, and the level controlled by hand. The talcing and winding up device 39 can be replaced by other treating means as may be desired, for example by a device for continuously vulcanising the tape.

FIGURE 2 illustrates a device for supplying latex to a bath at a substantially constant rate, which can be employed when a fixed bath is used and the control means illustrated in FIGURE 1 is not available. This comprises a frame 41 which carries a supply vessel 42 suspended from a cross bar 43 by a tension spring 44. The spring 44 is calibrated so that, whatever amount of latex is in the vessel 42, the level of the latex is the same and a constant head of latex is achieved. A feed pipe 45 provided with a valve (not shown) leads into the vessel 42, and a siphon 46 leads from the vessel 42 to the latex bath. Below the vessel 42 is a container 47 for a damping fluid, in which is a loosely fitting piston 48 attached to the bottom of the vessel 42. Fixed electric contacts 49, 50 are provided near to and to one side of the vessel 42, which itself carries a contact 51 adapted to engage either of the fixed contacts when the height of the vessel above the latex bath is at one or other of the limits of its useful range. When, as a result of a fall in the amount of the latex in the vessel, the spring 44 contracts, the vessel rises until the contact 51 engages the fixed contact 49. This closes a circuit and operates a relay whereby the valve in the feed pipe 45 is opened, so supplying latex into the vessel; the vessel then sinks, continuing to maintain the level of latex and the flow through the siphon, until the contact 51 engages the fixed contact 50. This closes a circuit and operates a relay which closes the valve in the feed pipe 45.

A device that may be used in conjunction with the above supply means to provide a fine control of the latex level in the tank 18 as shown in FIGURE 3. This comprises a testing device indicated generally by 61 and a bellows unit 62 controlled thereby. The testing device comprises a mount 63 of an insulating material carrying vertical conducting needles 64 and 65 extending downwards to slightly different levels, for example levels differing by between about 0.005 and 0.05 inch according to the delicacy of control required. (In the drawing the difference in levels is shown greatly exaggerated, for the sake of clarity.) A time-controlled reciprocating mechanism, shown generally at 66, causes the needles to move downwardly to their testing position at regular intervals, for example of 20–30 seconds or less. An open weave cotton fabric moves between spools 67 around guide rolls 68 and under the needles in their resting position, serving to clean them whenever they pass through it on coming into or leaving their testing position; the spools are interconnected with the reciprocating mechanism 66 and move the fabric on by a short distance after each passage of the needles therethrough.

The bellows device 62 is connected to a pipe 69 dipping well below the surface of the latex in the bath 18, and is so arranged that when the surface of the latex is at the correct level, the bellows are about half extended and half full of latex. The bellows can be extended or compressed by means of a controller indicated generally by 70, in separate electrical circuits with the latex in the bath and the needles 64 and 65 respectively. So long as only the circuit involving the longer needle 64 is closed, the controller is unaffected. If both circuits are open, it causes the bellows to close so forcing further latex into the bath. Similarly if both circuits are closed it causes the bellows to extend and withdraw latex from the bath. Naturally the controller is arranged to operate only when the needles are in their testing position.

FIGURES 4 and 5 illustrate a device for simultaneously washing and longitudinally folding a tape formed for example on a device as illustrated in FIGURE 1. This comprises a washing tank 71 through which a stream of water is caused to flow, by means not shown, in countercurrent to the direction of travel of the tape. The tape, indicated by 72, is led over a guide roll 73 and under a roll 74 of small diameter positioned below the surface of the water in the tank. After travelling for some distance below the surface, the tape is led first between vertical supports 77 spaced so as to form the tape into a U-configuration, and then between still more closely spaced forwardly inclined supports 78 whereby the two sides of the U are turned inwards. The tape then passes at a fairly sharp angle over a small diameter roll 79, which completes the folding operation, and removes any residual water from between the folded portions. The tape is led away in the folded form over a guide roll 80 to the drier.

FIGURE 6 illustrates a device comprising two more or less closely spaced vertical supports 81 followed by a horizontal roll 82, by means of which a single longitudinal fold can be imparted to the tape.

FIGURE 7 illustrates a device for building a laminated tape from two tapes produced simultaneously. This apparatus comprises a washing tank 83 through which a stream of water is caused to flow as in the device of FIGURE 4. The tapes, indicated by 84 and 85, are led over guide rolls 86 and 87 and through the water under the corresponding pairs of rolls 88, 89 and 90, 91. The two tapes are then brought together over the small diameter roll 92 and the combined tapes pass under the roll 93. The two tapes are thereby compressed into a single laminated tape 94 which is passed over guide and tensioning rolls 95 and 96.

In place of the tensioning roll 95 a pair of rolls (squeeze rolls) can be used to assist in removing any residual water from between the plies of the laminate.

Three or more tapes produced simultaneously can in a similar way be applied together to form a still thicker laminated tape.

The invention is further illustrated by the following examples.

*Example I*

In this example a device as illustrated in FIGURE 1 was used.

A 4 inch wide endless fabric-reinforced rubber belt, about 18 feet long, faced with a butadiene-acrylonitrile copolymer, was passed at a rate of 5 feet per minute over the roller 15 running in a coagulant solution consisting of a 40 percent solution of calcium chloride in water. The belt, now carrying a layer of coagulant, touched the surface of the latex in the bath 18. The composition of the latex was as follows:

| | Parts by weight (dry) |
|---|---|
| Natural rubber | 100 |
| Sodium hydroxide | 0.2 |
| Potassium oleate | 1.0 |
| Zinc oxide | 5.0 |
| Sulphur | 1.5 |
| Antioxidant 425 [2,2'-methylene-bis-(4-ethyl-6-t-butylphenol)] | 1.0 |
| Zinc dibutyl dithiocarbamate | 0.25 |
| Titanium dioxide | 5.0 |

Water to give a total solids content of 55%.

(The sulphur was added at a late stage to limit the degree of prevulcanisation.) In less than 2 minutes the latex film deposited on the belt was firmly gelled. The resulting rubber tape separated readily from the belt at the guide roll 12 and was washed with water from above and below. The tape then passed to a hot air chamber through which it travelled supported on rolls and in which it was dried. The dried rubber tape was batched up, using French chalk, and cured in a closed container at 100° C. for 24 hours. The tape produced had a very uniform thickness of 0.011 inch.

*Example II*

Two separate rubber tapes were made simultaneously by the method described in Example I and were washed in the bath illustrated in FIGURE 7. The two tapes ran one immediately above the other in the wash bath and were then applied together under the water, taken up out of the water as a double thickness tape, passed over the small diameter roll 95 at a fairly sharp angle, and led down into a drying unit. The dried double thickness rubber tape was batched up, using French chalk, and cured in a closed container at 100° C. for 24 hours. The tape produced had a very uniform thickness of 0.017 inch.

*Example III*

In this example the apparatus described in Example I was used, modified by the provision of two rollers above the latex bath 18 giving a contact distance of 4 feet between the belt and the surface of the latex. The belt travelled 7 feet per minute, and the coagulant was a 40 percent solution of calcium chloride in water. The composition of the latex in the bath was as follows:

| | Parts by weight (dry) |
|---|---|
| Natural rubber | 100 |
| Sodium hydroxide | 0.2 |
| Potassium oleate | 1.0 |
| "Santobrite" (bactericide) | 0.02 |
| 2,2'-methylene-bis-(4-ethyl-6-t-butylphenol) | 1.0 |
| Zinc dibutyldithiocarbamate | 0.25 |
| Ultramarine Blue | 0.1 |
| Zinc oxide | 2.0 |
| Sulphur | 1.0 |

Water to give a total solids content of 58%.

The resulting rubber tape separated readily from the belt at the guide roll 12 and was passed into a wash bath. The tape then passed to a chamber through which it was carried on belts and in which it was dried by infra-red heaters. The dried rubber tape was batched up, using French chalk, and cured in a closed container at 100° C. for 24 hours. The tape produced had a very uniform thickness of 0.018 inch and was particularly useful, when cut into suitable widths, as a golf ball tape.

*Example IV*

An apparatus as illustrated in FIGURE 1, with a folding device as illustrated in FIGURES 4 and 5, was employed; the belt 10 was a 7 inch wide endless fabric-reinforced rubber belt faced with a butadiene-acrylonitrile copolymer, running at 8 feet per minute. The coagulant was a 40 percent aqueous calcium chloride solution. The composition of the latex was as follows:

| | Parts by weight (dry) |
|---|---|
| Natural rubber | 100 |
| Sodium hydroxide | 0.2 |
| Potassium oleate | 1.0 |
| Zinc oxide | 5.0 |
| Sulphur | 1.5 |
| 2,2'-methylene-bis-(4-ethyl-6-t-butylphenol) | 1.0 |
| Mercaptobenzthiazole | 0.75 |
| Titanium dioxide | 5.0 |

Water to give a total solids content of 55%.

In less than two minutes the latex film deposited on the belt was coagulated and firmly consolidated. The resulting tape separated readily from the belt at the guide roll 12 and was washed and longitudinally folded. The washed tape was dried and vulcanised. The tape produced had a very uniform thickness of 0.021 inch. The product was particularly useful for the production of thread by cutting in the known way.

We claim:

1. Process for the production of thin rubber tapes having a uniform thickness within the limits of ±2.5 percent, which comprises, in order, applying a thin layer of liquid latex coagulant to the under side of a support, contacting the thus-supported layer of coagulant with the surface of a body of latex for a period of up to 5 seconds while maintaining the level of said body of latex constant within ±0.05 inch whereby the interaction of said coagulant and said latex forms on said support a thin tape of coagulated rubber, stripping said coagulated rubber tape from said support, washing, drying, and curing said rubber tape.

2. Process for the production of thin rubber tapes which comprises, in order, applying a thin layer of liquid latex coagulant to the under sides of a plurality of separate supports, simultaneously contacting the thus-supported layers of coagulant with the surface of a body of latex for a period of up to 5 seconds while maintaining the level of said body of latex constant within ±0.05 inch whereby the interaction of said coagulant and said latex forms on each said support a thin tape of coagulated rubber, stripping said coagulated tapes from their supports, bringing the stripped tapes into face-to-face contact and compressing to laminate the same, washing, drying, and curing the laminated rubber tapes.

3. Process which comprises forming a coagulated rubber tape on a belt according to the process of claim 1, removing the coagulated tape from the belt, simultaneously washing and longitudinally folding the tape, followed by drying and curing the said folded tape.

4. A rubber tape-forming apparatus comprising a bath adapted to contain latex, two valve-controlled pipes for feeding latex to said bath, said bath being mounted on a pivoted arm carrying a counterweight for balancing said bath and arm, means for maintaining a predetermined level of latex in said bath including a first electric circuit for actuating the valve in one of said feed pipes, a second electric circuit for actuating the other of said valves, said circuits being open when said bath is balanced, means carried by said arm for closing said first circuit in a first unbalanced position of said bath and for closing said second circuit in the opposite unbalanced position of said bath, an endless belt, a plurality of guide rolls for said belt, means for passing said belt over said bath at said predetermined level, means for applying a coagulant to the outer surface of said belt before passing said belt over said bath, and means for removing tape thereby formed on said belt.

References Cited by the Examiner
UNITED STATES PATENTS

| 1,983,967 | 12/34 | Cheek | 18—57 |
| 2,129,607 | 9/38 | Schott | 18—57 |
| 2,147,293 | 2/39 | Hansen | 18—57 |
| 2,170,441 | 8/39 | Albright | 18—57 |
| 2,203,822 | 6/40 | Hyman | 153—53.6 |
| 2,241,814 | 5/41 | Hansen | 264—216 XR |
| 2,266,263 | 12/41 | Raiche | 18—58.6 XR |
| 2,599,374 | 6/52 | Davis | 118—7 |
| 2,728,439 | 12/55 | Nurphy et al. | 154—117 XR |

EARL M. BERGERT, *Primary Examiner.*

CARL F. KRAFFT, *Examiner.*